US010890967B2

(12) United States Patent
Stellmach et al.

(10) Patent No.: US 10,890,967 B2
(45) Date of Patent: Jan. 12, 2021

(54) SYSTEMS AND METHODS FOR USING EYE GAZE TO BEND AND SNAP TARGETING RAYS FOR REMOTE INTERACTION (71) Applicant: Microsoft Technology Licensing, LLC, Redmond, WA (US)

(72) Inventors: Sophie Stellmach, Seattle, WA (US); Sheng Kai Tang, Redmond, WA (US); Casey Leon Meekhof, Redmond, WA (US); Julia Schwarz, Redmond, WA (US); Nahil Tawfik Sharkasi, Woodinville, WA (US); Thomas Matthew Gable, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/030,234

(22) Filed: Jul. 9, 2018

(65) Prior Publication Data

US 2020/0012341 A1 Jan. 9, 2020

(51) Int. Cl.
*G09G 5/00* (2006.01)
*G06F 3/01* (2006.01)
*G02B 27/01* (2006.01)
*G06F 3/0481* (2013.01)
*G06K 9/00* (2006.01)

(52) U.S. Cl.
CPC ......... *G06F 3/013* (2013.01); *G02B 27/0172* (2013.01); *G02B 27/0179* (2013.01); *G06F 3/017* (2013.01); *G06F 3/04815* (2013.01); G02B 2027/0138 (2013.01); G02B 2027/0187 (2013.01); G06K 9/00355 (2013.01)

(58) Field of Classification Search
CPC ...... G06F 3/017; G06F 3/04815; G06F 3/013; G06F 3/04842; G06K 9/00355; G02B 27/0172; G02B 27/0179

USPC .............. 345/8, 156, 158; 359/630
See application file for complete search history.

(56) References Cited

U.S. PATENT DOCUMENTS

| 9,547,371 | B2 | 1/2017 | Park et al. |
| 9,778,814 | B2 | 10/2017 | Ambrus et al. |
| 9,910,506 | B2 | 3/2018 | Spiessl et al. |
| 2011/0043517 | A1* | 2/2011 | Schneider ............... G06F 17/50 345/419 |

(Continued)

FOREIGN PATENT DOCUMENTS

| EP | 1906298 A2 | 4/2008 |
| EP | 2996020 A1 | 3/2016 |
| EP | 3316075 A1 | 5/2018 |

OTHER PUBLICATIONS

"Exclusive: Summoning & Superpowers—Designing VR Interactions at a Distance", Retrieved From: https://www.roadtovr.com/exclusive-summoning-superpowers-designing-vr-interactions-at-a-distance/3/, Jan. 22, 2018, 9 Pages.

(Continued)

*Primary Examiner* — Jennifer T Nguyen
(74) *Attorney, Agent, or Firm* — Ray Quinney & Nebeker P.C.; John O. Carpenter (57) ABSTRACT A method for improving user interaction with a virtual environment includes presenting the virtual environment to a user on a display, measuring a gaze location of a user's gaze relative to the virtual environment, casting an input ray from an input device, measuring an input ray location at a distal point of the input ray, and snapping a presented ray location to the gaze location when the input ray location is within a snap threshold distance of the input ray location.

20 Claims, 7 Drawing Sheets

(56) References Cited

U.S. PATENT DOCUMENTS

| | | | |
|---|---|---|---|
| 2015/0338651 A1 | 11/2015 | Wang et al. | |
| 2016/0048223 A1* | 2/2016 | Taguchi | G06F 3/013 345/157 |
| 2016/0179336 A1* | 6/2016 | Ambrus | G02B 27/017 715/768 |
| 2017/0147078 A1 | 5/2017 | van Iaack et al. | |
| 2017/0293363 A1 | 10/2017 | Mclaughlin | |
| 2017/0358144 A1 | 12/2017 | Schwarz et al. | |
| 2018/0011533 A9 | 1/2018 | Marggraff et al. | |
| 2019/0294312 A1* | 9/2019 | Rohrbacher | G06F 3/0482 |

OTHER PUBLICATIONS

"Gaze+Gesture: Expressive, Precise and Targeted Free-Space Interactions", Retrieved From https://www.youtube.com/watch?v=ljV2D69Gpio%20(Gaze+Gesture:%20Expressive,%20Precise%20and%20Targeted%20Free-Space%20Interactions), Nov. 12, 2015, 4 Pages.

Pfeuffer, Ken, "Gaze + Pinch Interaction in Virtual Reality", Retrieved From https://www.youtube.com/watch?v=NzLrZSF8aDM8omp=&feature=youtu.be%20(Gaze%20+%20Pinch%20Interaction%20in%20Virtual%20Reality), Oct. 28, 2017, 5 Pages.

Pfeuffer, et al., "Gaze and Touch Interaction on Tablets", Retrieved From https://www.youtube.com/watch?v=K_BzewnB06c%20(Gaze%20and%20Touch%20Interaction%20on%20Tablets), Oct. 4, 2016, 4 Pages.

Zeleznik, et al., "Look-That-There: Exploiting Gaze in Virtual Reality Interactions", In Technical Report CS-05, Mar. 2005, 7 Pages.

"International Search Report and Written Opinion Issued in PCT Application PCT/US2019/039636", dated Oct. 4, 2019, 12 Pages.

* cited by examiner

SYSTEMS AND METHODS FOR USING EYE GAZE TO BEND AND SNAP TARGETING RAYS FOR REMOTE INTERACTION

CROSS-REFERENCE TO RELATED APPLICATIONS

N/A

BACKGROUND

Background and Relevant Art

With emerging ubiquitous user interfaces (UI), such as smart devices and innovative head-mounted display technology, usage of such UIs becomes more common among non-specialists. Interaction with the UIs may be improved by making the interaction more intuitive and subtle. A well-established input paradigm is point-and-click or in more general terms: point-and-command. In emerging natural UIs, a command could for instance be triggered by different voice commands, hand gestures, or touch input.

An effortless and subtle way to indicate a user's context is to take advantage of gaze tracking data to infer a user's current reference frame. Several problems arise with this approach though, as eye tracking and additional commands are asynchronous (i.e., the eye gaze usually precedes manual inputs and may have moved on to new targets upon finishing recognition of the manual input). In addition, due to technological constraints of the tracking system as well as physiological constraints of the human visual system, the computed gaze signal may be jittery and show offsets compared to the actual eye gaze. This increases the problem of reliably referring to small and closely positioned targets. Thus, an overall problem arises about how such multimodal inputs can be appropriately combined.

BRIEF SUMMARY

In some embodiments, a method for improving user interaction with a virtual environment includes presenting the virtual environment to a user on a display, measuring a gaze location of a user's gaze relative to the virtual environment, casting an input ray from an input device, measuring an input ray location at a distal point of the input ray, and snapping a presented ray location to the gaze location when the input ray location is within a snap threshold distance of the input ray location.

In some embodiments, a method for improving user interaction with a virtual environment includes presenting the virtual environment to a user on a display, measuring a gaze location of a user's gaze relative to the virtual environment, casting an input ray from an input device, measuring an input ray location at a distal point of the input ray, snapping a presented ray location to the gaze location when the input ray location is within a snap threshold distance of the input ray location, moving the gaze location, and tracking the gaze location with the presented ray location when the presented ray location remains within an unsnap threshold distance of the input ray location.

In some embodiments, a system for presenting visual information to a user includes a head-mounted display. The head-mounted display includes a display device, a gaze-tracking device, a processor in data communication with the display device and the gaze-tracking device, and a hardware storage device in data communication with the processor. The hardware storage device has instructions thereon that, when executed by the processor, cause the processor to: present a virtual environment to the user on a display, measure a gaze location of a user's gaze relative to the virtual environment, cast an input ray from an input device, measure an input ray location at a distal point of the input ray, and snap a presented ray location to the gaze location when the input ray location is within a snap threshold distance of the input ray location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for visual user interaction with virtual environments. More specifically, the present disclosure relates to improving interaction with virtual elements using gaze-based guidance of a targeting ray used for selection and manipulation. In some embodiments, visual information may be provided to a user by a near-eye display. A near-eye display may be any display that is positioned near a user's eye, either to supplement a user's view of their surroundings, such as augmented or mixed reality (MR) devices, or to replace the user's view of their surroundings, such as virtual reality (VR) devices. In some embodiments, an augmented reality (AR) or MR device may be a head-mounted display (HMD) that presents visual information to a user overlaid on the user's view of their surroundings. For example, the visual information from the HMD may be combined with ambient or environment light to overlay visual information, such as text or images, on a user's surroundings.

In some embodiments, the user's field of view may be at least partially encompassed by a waveguide through which the user views their surroundings. The waveguide may direct display light from a display device to the user's field of view. The waveguide may guide the display light before out-coupling the light. Upon out-coupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes.

Visual information including virtual elements may be positioned in the user's field of view on the waveguide or other near-eye display. A gaze-tracking device of the HMD may image at least a portion of the user's eye (such as the pupil, the iris, the sclera) and identify a direction or location of the user's gaze. The direction or location of the user's gaze may then be extrapolated to a position on the near-eye display. A selection cursor may be associated with the gaze location to allow the user to highlight or select a virtual element by looking at the virtual element. In other embodiments, a gaze-tracking device may include a gyroscope, an accelerometer, a plurality of sensors to triangulate position, or other devices that allow for the measurement of the orientation and/or position of the HMD relative to the virtual environment. For example, the user's "gaze" may be a ray cast from the HMD forward from the HMD to approximate the user's gaze by approximating the user's head position and orientation as their gaze direction. In some examples, such a head-tracking "gaze" may be simpler than an eye-tracking gaze, as the user remains free to glance around in their field of view without inadvertently moving a gaze position cursor. In other examples, an eye-tracking gaze may be more intuitive as a user will naturally look at whatever object is of interest to the user during interactions with the virtual environment.

In some embodiments, gaze-informed movement and manipulation of virtual objects, either by eye-tracking gaze or by head-tracking gaze, may allow for rapid movement of virtual objects within a virtual or shared environment. In other embodiments, gaze-informed movement and manipulation of a virtual object may be employed in combination with manual, voice, peripheral, or other inputs to provide different scales of movement and manipulation for both speed and precision.

Figure 1:
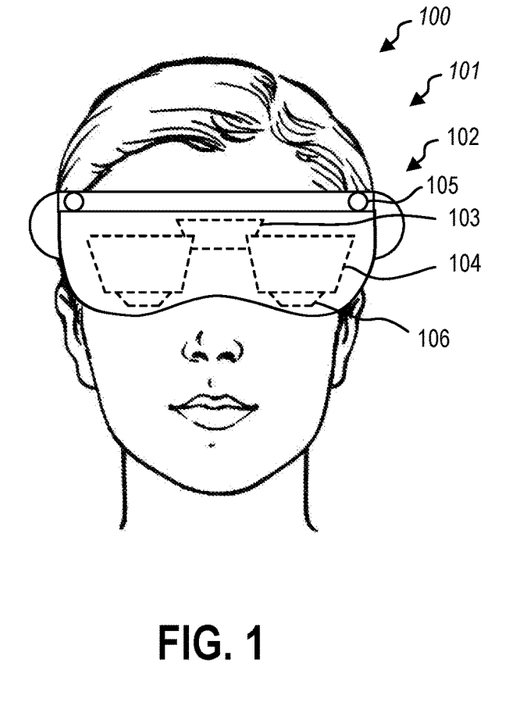
FIG. 1 is a perspective view of a head-mounted display (HMD) including a waveguide, according to at least one embodiment of the present disclosure.

FIG. 1 is a perspective view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be positioned optically adjacent a waveguide(s) or other near-eye display 104 to provide visual information to the near-eye display 104, which may, in turn, be presented in the user's field of view by the near-eye display 104.

In some embodiments, the HMD 101 may have a near-eye display 104 positioned near the user 100 to direct visual information to the user 100. The HMD 101 may include a single near-eye display 104, a separate near-eye display 104 for each of the user's eyes (i.e., two near-eye displays 104), or more than two near-eye displays 104 to provide visual information over a larger field of view.

In some embodiments, the HMD 101 may include one or more cameras 105 that may image the user's physical environment. For example, the camera(s) 105 may be visible light camera(s) 105 that may image the surrounding environment. A processor may perform image recognition routines on the visible light image to detect and recognize elements in the surrounding environment. In other examples, the camera(s) 105 may be depth sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may be gesture recognition cameras that allow the HMD 101 to recognize and interpret hand gestures performed by the user 100 in front of the HMD 101.

In some embodiments, the HMD 101 may further include a gaze-tracking device 106 positioned in the HMD 101 to track a direction of the user's gaze. The gaze-tracking device 106 may include a camera or a plurality of cameras to image the user's eyes. In other words, the gaze-tracking device 106 may image the user's pupil, iris, sclera, other portions of the user's eye, or combinations thereof to calculate the direction the user is looking. In some embodiments, the gaze-tracking device 106 may measure and/or calculate the x- and y-components of the user's gaze. In other embodiments, the gaze-tracking device 106 may include a gyroscope, an accelerometer, a plurality of sensors to triangulate position, or other devices that allow for the measurement of the orientation and/or position of the HMD relative to the virtual environment. For example, the user's "gaze" may be a ray cast from the HMD forward from the HMD to approximate the user's gaze by approximating the user's head position and orientation as their gaze direction.

Figure 2:
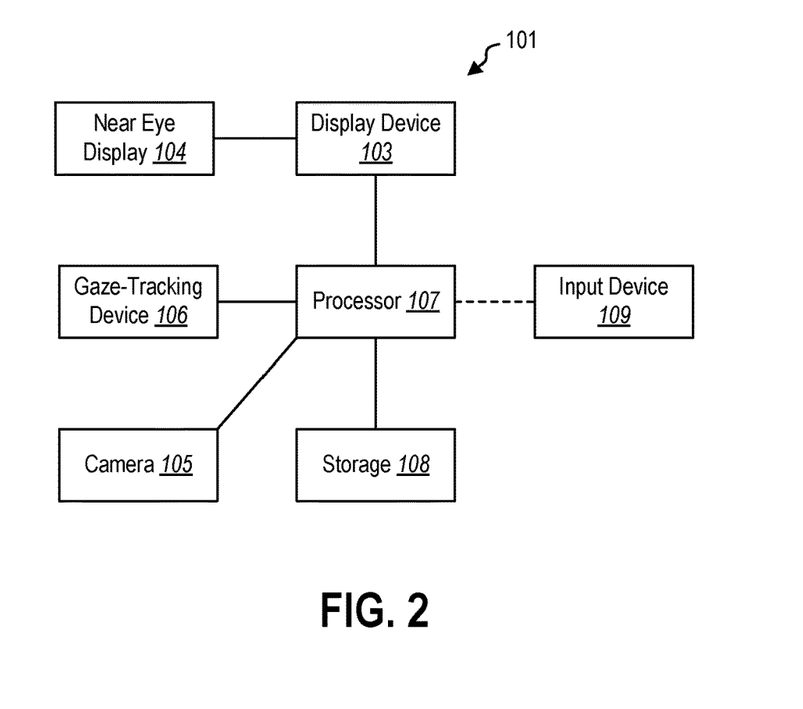
FIG. 2 is a schematic representation of the HMD of FIG. 1, according to at least one embodiment of the present disclosure.

FIG. 2 is a schematic representation of the HMD 101. The display device 103 in communication with the near-eye display 104 may be in data communication with a processor 107. Similarly, the camera 105 and gaze-tracking device 106 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 has instructions stored thereon to perform one or more methods or portions of a method described herein. In some embodiments, an input device 109 may be in data communication with the processor 107. The input device 109 may be any device capable of providing user inputs including location and/or movement inputs to the system. For example, any device capable of positioning a cursor at a location may be an input device 109 for the present description. In some examples, an input device 109 may be a motion controller, such as a six-degree-of-freedom (6DOF) controller or a three-degree-of-freedom (3DOF) controller; a gesture recognition device configured to recognize user hand locations and/or gesture inputs; a touch-sensing device, such as a touchscreen device, a trackpad, or other touch-sensing device; a mouse; a trackball; or other device capable of positioning a cursor at a location in the virtual environment presented by the HMD 101.

Figure 3:
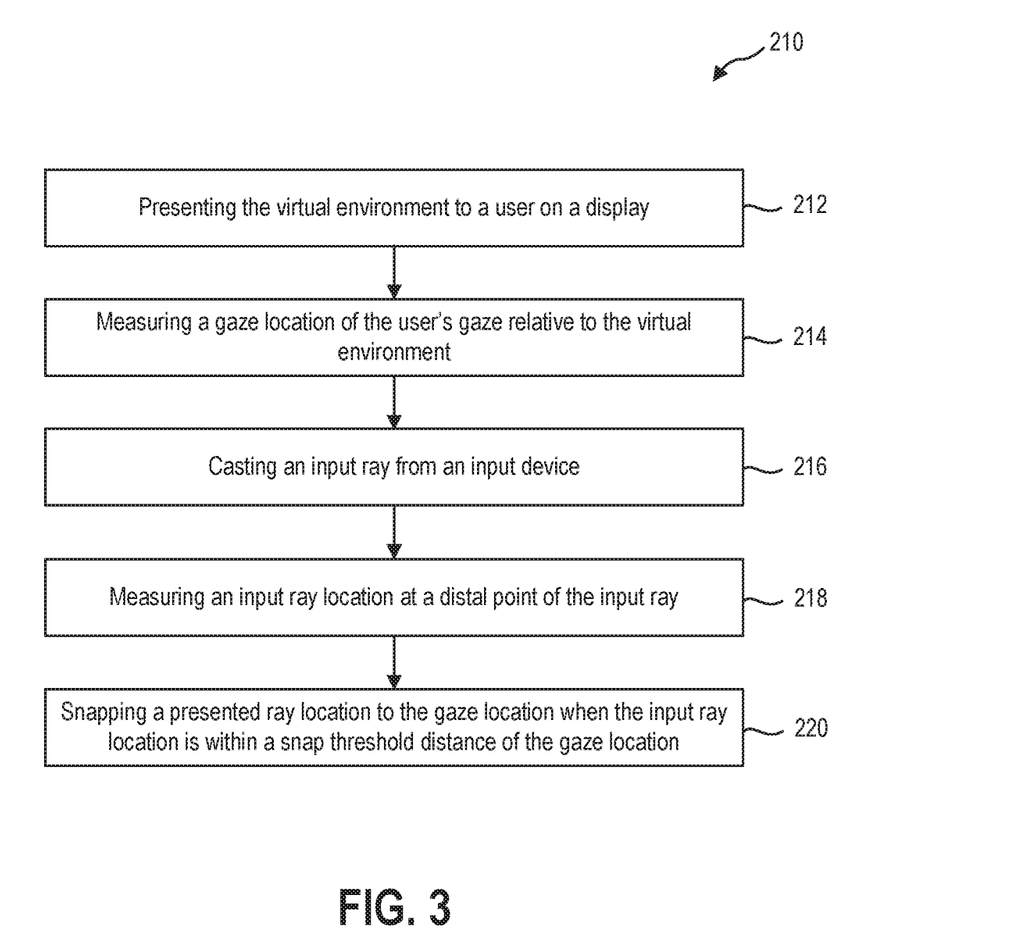
FIG. 3 is a flowchart illustrating a method of gaze-assisted targeting with an input device in a virtual environment, according to at least one embodiment of the present disclosure.

FIG. 3 is a flowchart illustrating a method 210 of improving user interaction with a virtual environment, according to at least one embodiment of the present disclosure. The method 210 includes presenting a virtual environment to a user on a display at 212. The virtual environment may be combined with a physical environment to create a shared environment, such as when the virtual environment is displayed on a waveguide or other transparent near-eye display. In other examples, the virtual environment may be presented on an opaque near-eye display, replacing the user's view of the physical environment with the presented virtual environment.

The method 210 includes measuring a gaze location of the user's gaze relative to the virtual environment at 214. The gaze location may be measured by using a gaze-tracking device described herein to measure the position of either the user's gaze based on eye tracking or the user's gaze based on head tracking. In some embodiments, a gaze location may include jitter. The jitter may be mitigated and/or the movement of the gaze location may be smoothed by calculating the gaze location as a gaze cloud or by using smoothing functions.

The gaze cloud may include a quantity of detected gaze positions that are collected in sequence by the gaze-tracking device. The gaze cloud may be calculated by including a plurality of detected gaze positions. For example, the gaze cloud 322 may include a quantity of detected gaze positions in a range having an upper value, a lower value, or upper and lower values including any of 2, 3, 4, 5, 6, 8, 10, 12, 15, 20, 30, 40, 50, 100, or any values therebetween. For example, the gaze cloud 322 may include at least 2 detected gaze positions. In other examples, the gaze cloud 322 may include less than 100 detected gaze positions. In yet other examples, the gaze cloud 322 may include between 2 and 100 detected gaze positions. In further examples, the gaze cloud 322 may include between 3 and 50 detected gaze positions. In yet other examples, the gaze cloud 322 may include between 4 and 20 detected gaze positions. In at least one example, the gaze cloud 322 may be calculated using about 10 detected gaze positions.

In some embodiments, the gaze location may include x- and y-coordinates relative to the user's perspective in the virtual environment, such as when interacting with a virtual desktop with a HMD. In other embodiments, the gaze location may include x-, y-, and z-coordinates relative to the user, such as when interacting with virtual elements in three-dimensional space. In some embodiments, the three-dimensional space may be a virtual environment generated by the HMD or other computing device in communication with the HMD. In other embodiments, the three-dimensional space may be a shared environment. For example, a mixed reality HMD may present virtual elements in combination with a surrounding physical environment of the user. In such embodiments, the HMD may measure the surrounding physical environment of the user using, for example, the cameras on the HMD or other sensors to impart information of the surrounding physical environment into a virtual environment to create a shared environment. The HMD may then use the shared environment to position a virtual element in a virtual environment relative to a physical element of the surrounding physical environment.

In some embodiments in a three-dimensional space, the gaze location may be measured by casting a ray from the HMD in the direction of a user's gaze detected by the gaze-tracking device, and the gaze location may be the location where the ray interacts with a surface of the virtual environment or the shared environment. For example, the ray may interact with an upper surface of a virtual element, and the gaze location may be measured as having coordinates on the upper surface of the virtual element. In other examples, the ray may interact with a physical object, such as a surface of a table in front of a user. The first position may be measured as having coordinates on the surface of the physical table.

In other embodiments in a three-dimensional space, the gaze location may be measured using the focal distance of the detected gaze of each of the user's eyes. For example, the detected eye position and related gaze direction of each eye will be different based on the distance of the object at which the user is looking. The different gaze locations of each eye may allow the calculation of a focal depth of the user. Measuring the gaze location using focal depth of the user's gaze may allow for the gaze location to be located in space, and not on a (virtual or physical) surface.

The method 210 further includes casting an input ray from an input device at 216. In some embodiments, the input device may be a gesture recognition device, such as the camera(s), in data communication with the processor of the HMD. In other embodiments, the input device may be a voice recognition device, such as a microphone, in data communication with the processor of the HMD. In yet other embodiments, the input device may be a motion controller, such as a six degree-of-freedom (6DOF) controller, in data communication with the processor of the HMD. In yet other embodiments, the input device may be an input of a touch-sensing device, trackpad, mouse, keyboard or other conventional human interface device (HID) of a computer.

The input ray is cast from the input device in the virtual environment. For example, the input ray of a 6DOF motion controller originates at the position of the 6DOF motion controller in the virtual environment measured by the camera(s) of the HMD. In other examples, the input ray of a gesture recognition device originates at the position of the user's hand in the virtual environment measured by the camera(s) of the HMD. In yet other examples, the input ray of a touch-sensing device positioned on a desk or other surface may originate at the position of the touch-sensing device on the desk in the virtual environment measured by the camera(s) of the HMD.

The method 210 further includes measuring an input ray location at a distal point of the input ray at 218 distal from the input device, itself. For example, the input ray may originate at the input device and the input ray location may be a point along the input ray, outward from the input device in the virtual environment.

In some embodiments, the input ray location includes x- and y-coordinates relative to the user's perspective in the virtual environment, such as when interacting with a virtual desktop with a HMD. In other embodiments, the input ray location includes x-, y-, and z-coordinates relative to the user, such as when interacting with virtual elements in three-dimensional space. In some embodiments, the three-dimensional space is a virtual environment generated by the HMD or other computing device in communication with the HMD. In other embodiments, the three-dimensional space is a shared environment.

In some embodiments, the input ray location may be a point at which the input ray intersects with a point, line, or surface in the virtual environment. For example, the input ray may be cast from the input device like a laser, and the input ray location may be the point illuminated by the laser. In other examples, the input ray location may be a point at a set distance along the input ray. For example, the input ray may be cast from the input device like a rod or pointer stick, and the input ray location may be the terminal distal end of the rod. In at least one embodiment, the input ray location may be a point of the input ray closest to the gaze location. For example, the gaze location may have x-, y-, and z-coordinates relative to the user in the virtual environment and the input ray may project from the input device through the virtual environment. The input ray location may be the point (having x-, y-, and z-coordinates relative to the user in the virtual environment) that is closest to the gaze location in the virtual environment.

The method 210 further includes snapping a presented ray location to the gaze location when the input ray location is within a snap threshold distance of the gaze location at 220. In some embodiments, a visualization of the input ray may be displayed to the user in the virtual environment. The presented ray may coincide with the input ray until the ray "snaps" to the gaze location. The presented ray may display a curve, bend, corner, or other deviation from the input ray, such that the presented ray is visualized to the user as projecting from the input device to the gaze location. The input ray and input ray location may be measured by the HMD or other computing device, while the presented ray is displayed to the user. The presented ray location is the location of the presented ray intersecting the gaze location.

At least some interactions with the virtual environment via the input device, such as selecting a virtual element at the gaze location, may be considered to be directed at the presented ray location irrespective of the input ray location. For example, the input ray may be positioned in the virtual environment to the side of a virtual element, while the gaze location is on the virtual element. When the input ray location is with the snap threshold distance, the presented ray location may snap to the gaze location on the virtual element, enabling interaction with the virtual element even if the input ray does not coincide with the virtual element.

In some embodiments, the method 210 may further include selecting a virtual element at the presented ray location when snapped to the gaze location. The virtual element may be selected upon receiving a selection command from an input device.

In some embodiments, the selection command and the intended gaze location at the time of the selection command may be asynchronous. For example, a user may look at a virtual element that the user intends to select. The user may begin providing a selection input (e.g., a gesture input, a mouse click, a voice input) to provide the selection command and look away to a second position, moving the gaze location, before the selection input completes and the selection command is received. This may be common among even experienced users, as conventional interactions with computer systems allow for independent movement of the user's eyes and a selection cursor.

In such embodiments, the selection command may select a virtual element the gaze location was positioned on prior to moving away. For example, measuring the first position of the gaze location may include measuring a series of first locations of the gaze location such that the system may "look back" to where the gaze location was prior to receiving the selection command. In some embodiments, measuring the first position of the gaze location may include measuring and retaining in memory at least 2, 3, 4, 5, 10, 15, 20, or more gaze locations. In other embodiments, measuring the first position of the gaze location may include measuring and retaining in memory all positions of the gaze location for a buffer time, such as 5 milliseconds (ms), 10 ms, 15 ms, 20 ms, 25 ms, 50 ms, 100 ms, 500 ms, or more time. For example, upon receiving a selection command, the system may select the virtual element the user was looking at 10 ms prior to receiving the selection command. In other examples, upon receiving a selection command, the system may iterate through the gaze locations measured during the buffer time until a gaze location coincides with a virtual element.

Figure 4:
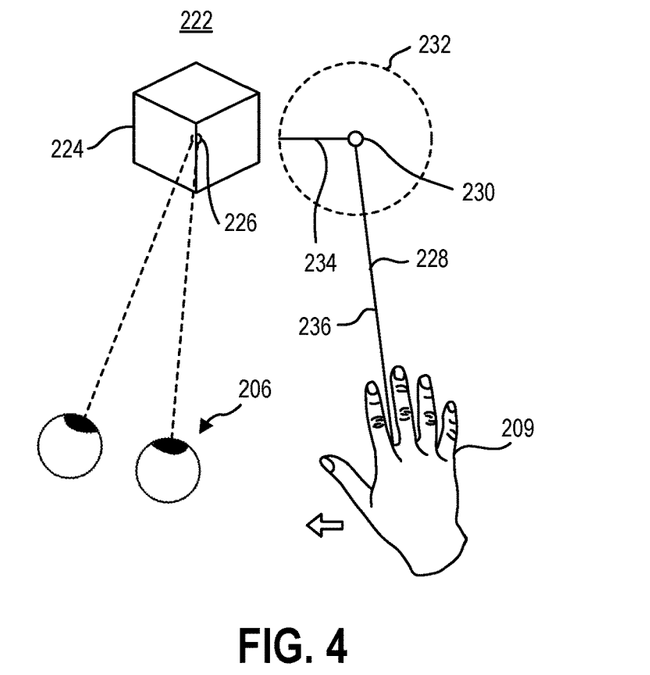
FIG. 4 is a schematic representation of a user interacting with a virtual environment, according to at least one embodiment of the present disclosure.

FIG. 4 is a schematic representation of a virtual environment 222 containing a virtual element 224 that may be presented to a user on a display, such as the waveguide of the HMD 101 of FIG. 1, a display of a MR system, a display of a VR system, a display of an AR system, or other near-eye display in communication with a processor and/or a gaze-tracking device. While the present disclosure described interaction with the virtual environment 222 through a HMD, it should be understood that in other embodiments, the virtual environment 222 may be presented on another display, such as a laptop, tablet, desktop, large format, or other display in communication with a processor and/or a gaze-tracking device. For example, the methods and systems described herein may be equally applicable to a user interacting with a large format display on a wall of a conference room. The user may move and/or manipulate virtual elements using a gaze-tracking device and other input devices in communication with the large format display. In other examples a laptop may have a front facing camera that may function as a gaze-tracking device to allow gaze-based movement and/or manipulation of virtual elements by a user interacting with the laptop.

In some embodiments, the virtual element 224 is any element of the virtual environment that is selectable in the available software. For example, the virtual element 224 may be a window of an application presented in the virtual environment. In other examples, the virtual element 224 may be a computer-assisted design (CAD) model, a menu, a scroll bar, or another movable element of the virtual environment 222 or user interface. In yet other examples, the virtual element 224 may be a virtual representation of a physical element of the physical environment around a user.

In at least one example, the user may interact with the virtual element 224 and/or the virtual environment 222 by positioning their gaze at the virtual element 224 or another portion of the virtual environment 222. The gaze-tracking system 206, schematically represented in FIG. 4 by a user's eyes, in data communication with the processor of the HMD may measure a gaze location 226 at the virtual element 224.

The input device 209, schematically represented in FIG. 4 by a user's hand, may project the input ray 228 in the virtual environment. The input ray location 230 is a point along the input ray 228. As the input ray location 230 and gaze location 226 move closer relative to one another, either by translation or rotation of the input device 209, the gaze location 226 approaches a snap region 232 around the input ray location 230 that is based on the snap threshold distance 234.

Before the gaze location 226 is within the snap region 232, the input ray 228 projected from the input device 209 in the virtual environment 222 and the presented ray 236 that is displayed to the user in the virtual environment 222 may coincide with one another.

Figure 5:
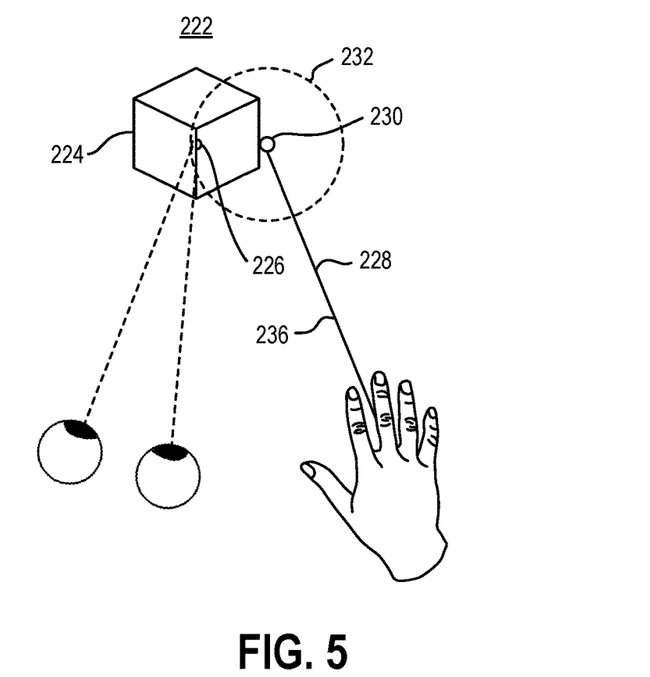
FIG. 5 is a schematic representation of a gaze location coinciding with a snap region of an input ray, according to at least one embodiment of the present disclosure.

Referring now to FIG. 5, movement of the input ray 228 in the virtual environment 222 causes the snap region 232 and gaze location 226 to coincide. When the gaze location 226 is in the snap region 232, the presented ray 236 may deviate from the input ray location 230. In some embodiments, the snap region 232 and gaze location 226 may both be overlapping a virtual element 224 without the input ray location 230 overlapping the virtual element 224.

Figure 6:
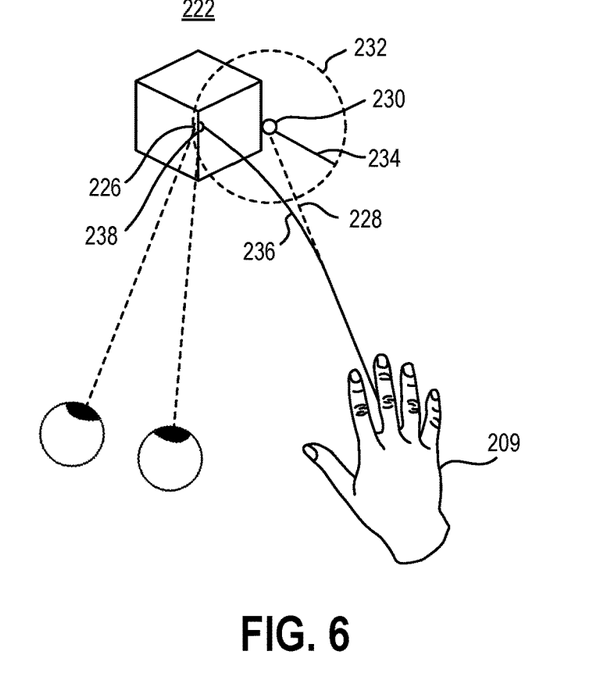
FIG. 6 is a schematic representation of a presented ray snapping to a gaze location, according to at least one embodiment of the present disclosure.

FIG. 6 illustrates the presented ray 236 and the presented ray location 238 snapped to the gaze location 226. The presented ray 236 and the presented ray location 238 may be displayed to the user on the HMD or other display, while the input ray 228 and input ray location 230 may remain projected in the virtual environment 222 without being displayed. In other words, the input ray 228 and the input ray location 230 may be projected in a straight line from the input device 209, while the user sees the presented ray 236 deviating from where the input ray 228 is located, such that the presented ray 236 appears to connect the snapped gaze location 226 and presented ray location 238 to the input device 209. In doing so, the user is provided visual feedback that the input device 209 is targeting the gaze location 226, even though the input device 209 may be casting an input ray 228 that is slightly off the gaze location 226. In such an embodiment, the targeting ray of the input device 209 is the presented ray 236, and the input device 209 may allow interaction with the virtual element 224 or other object at the gaze location 226 when the gaze location 226 and snap region 232 overlap, irrespective of the position of the input ray location 230. The presented ray 236 may remain snapped to and may track the gaze location 226 as the gaze location 226 moves within the snap region 232 (or within the unsnap region, as will be described in more detail).

In some embodiments, the snap region 232 is defined by the snap threshold distance 234. In some embodiments, the snap threshold distance 234 is an angular displacement relative to the user's viewpoint. For example, a snap threshold distance 234 may be less than 1° of angular movement relative to the user's perspective. In other examples, a snap threshold distance 234 may be less than 1.5° of angular movement relative to the user's perspective. In yet other examples, a snap threshold distance 234 may be less than 2° of angular movement relative to the user's perspective. In at least one example, it may be critical that the snap threshold distance 234 may be less than the foveal vision of the user such that the input device does not target objects in the user's peripheral vision. In other embodiments, the snap threshold distance 234 may be a translational distance relative the three-dimensional space of the virtual environment 222. For example, translating the input ray location 230 one meter backward on a tabletop relative to a gaze location 226 may require less angular displacement relative to the gaze location 226 than translating the input ray location 230 one meter to the right of the gaze location 226. However, the nominal distance moved may be the same.

Therefore, in some instances it may be more efficient for the snap threshold distance 234 to be relative to the translational distance of the gaze location 226 in the virtual environment 222. In some embodiments, the snap threshold distance 234 may be in a range having an upper value, a lower value, or upper and lower values including any of 1 centimeter (cm), 2 cm, 5 cm, 10 cm, 15 cm, 20 cm, 25 cm, 30 cm, or any values therebetween. For example, the snap threshold distance 234 may be greater than 1 cm. In other examples, the snap threshold distance 234 may be less than 30 cm. In yet other examples, the snap threshold distance 234 may be between 1 cm and 30 cm. In further examples, the snap threshold distance 234 may be between 5 cm and 20 cm.

Figure 7:
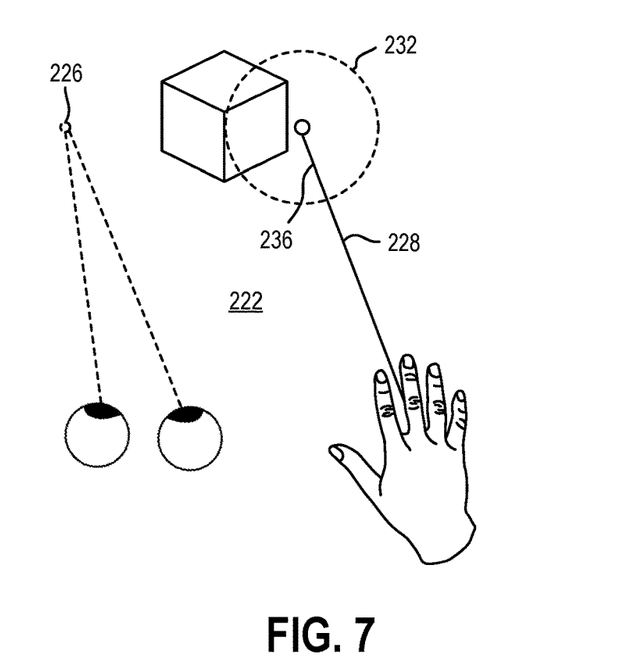
FIG. 7 is a schematic representation of the presented ray of FIG. 6 unsnapping to the input ray, according to at least one embodiment of the present disclosure.

Targeting the gaze location 226 for interaction with the input device 209 may allow more precise targeting by snapping the targeting ray to the gaze location 226 instead of the input ray location 230 when the gaze location 226 is within the snap region 232. FIG. 7 illustrates an example of the user looking at a different object or location within the virtual environment 222, moving the gaze location 226 outside of the snap region 232. The presented ray 236 may unsnap back to coincide with the input ray 228 after the gaze location 226 (and therefore, the user's attention) has left the snap region 232.

Figure 8:
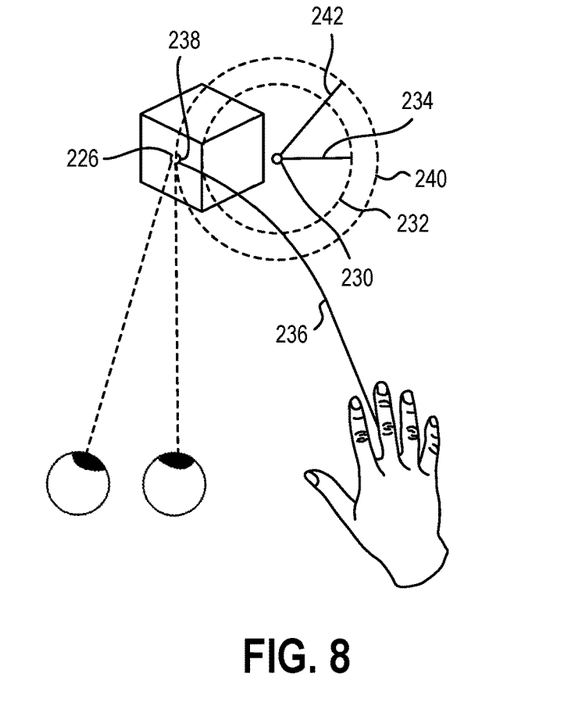
FIG. 8 is a schematic representation of the presented ray of FIG. 6 remaining snapped to a gaze location outside of the snap region, according to at least one embodiment of the present disclosure.

However, due to jitter in the gaze tracking (i.e., the gaze location 226), jitter in the input ray casting (i.e., the input ray location 230), or both, the presented ray 236 may snap and unsnap rapidly when the gaze location 226 is near the edge of the snap region 232. To mitigate this effect, some embodiments may have a snap region 232 and an unsnap region 240 that is different from the snap region 232, as illustrated in FIG. 8. For example, the presented ray 236 may snap to the gaze location 226 when the gaze location is within the snap region 232, as described herein. The presented ray 236 may then remain snapped to the gaze location 226 until the gaze location 226 moves outside of the unsnap region 240. In some examples, the unsnap threshold distance 242 may be greater than the snap threshold distance 234. In some embodiments, the unsnap threshold distance 242 may be at least 10% greater than the snap threshold distance 234. In some embodiments, the unsnap threshold distance 242 may be at least 20% greater than the snap threshold distance 234. In some embodiments, the unsnap threshold distance 242 may be at least 30% greater than the snap threshold distance 234. In some embodiments, the unsnap threshold distance 242 may be at least 50% greater than the snap threshold distance 234.

The user may look away from the intended target of an interaction before "clicking" or otherwise providing the selection command. In some embodiments, the system may use previous gaze locations for the interaction, as described herein; however in some examples, the movement of the gaze location 226 may unsnap the targeting ray (e.g., the presented ray 236) from the gaze location 226, decoupling the selection command from the gaze location 226. In other embodiments, after the user's gaze saccades away from the original gaze location 226, the presented ray location 238 may return toward the input ray location 230 after a delay and/or over an unsnap duration. This delay and/or dampening of the presented ray location 238 moving to the input ray location 230 may slow the straightening of the presented ray 236, allowing the selection command to be received and applied to the intended presented ray location 238.

In some embodiments, the delay between the user's gaze saccading away from the gaze location 226 and the presented ray location 238 moving back to the input ray location 230 may be in a range having an upper value, a lower value, or upper and lower values including any of 50 ms, 75 ms, 100 ms, 125 ms, 150 ms, 175 ms, 200 ms, or any values therebetween. For example, the delay may be greater than 50 ms. In other examples, the delay may be less than 200 ms. In yet other examples, the delay may be between 50 ms and 200 ms. In further examples, the delay may be between 100 ms and 175 ms. In at least one example, the delay may be about 150 ms.

In other embodiments, the unsnapping (i.e., straightening) of the presented ray 236 may be dampened such that the presented ray 236 straightens over an unsnap duration having an upper value, a lower value, or upper and lower values including any of 50 ms, 75 ms, 100 ms, 125 ms, 150 ms, 175 ms, 200 ms, or any values therebetween. For example, the unsnap duration may be greater than 50 ms. In other examples, the unsnap duration may be less than 200 ms. In yet other examples, the unsnap duration may be between 50 ms and 200 ms. In further examples, the unsnap duration may be between 100 ms and 175 ms. In at least one example, the unsnap duration may be about 150 ms.

Figure 9:
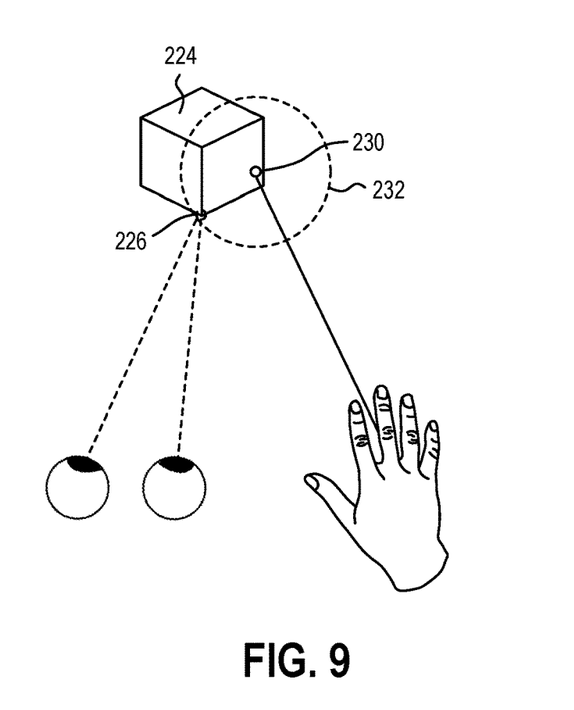
FIG. 9 is a schematic representation of a gaze location inside the snap region and outside of the targeted virtual element, according to at least one embodiment of the present disclosure.

While embodiments of methods of improving user interaction with a virtual environment have been described herein in relation to snapping a targeting ray to a gaze location, selection precision of virtual elements may be increased by using the gaze location and snap region of the input ray to snap the targeting ray to the virtual element instead of the gaze location. For example, a user's attention may be naturally drawn to high-contrast areas or borders of virtual elements. While a natural behavior, this behavior can limit the effectiveness of gaze-based targeting. FIG. 9 illustrates an example of a gaze location 226 at an edge of a virtual element 224. The input ray location 230 is positioned on the virtual element 224, and the snap region 232 includes over half of the virtual element 224. However, the gaze location 226 is positioned at the edge of the virtual element 224 and snapping the targeting ray to the gaze location 226 may pull the targeting ray off of the virtual element 224, interfering with selection of or other interaction with the virtual element 224.

Figure 10:
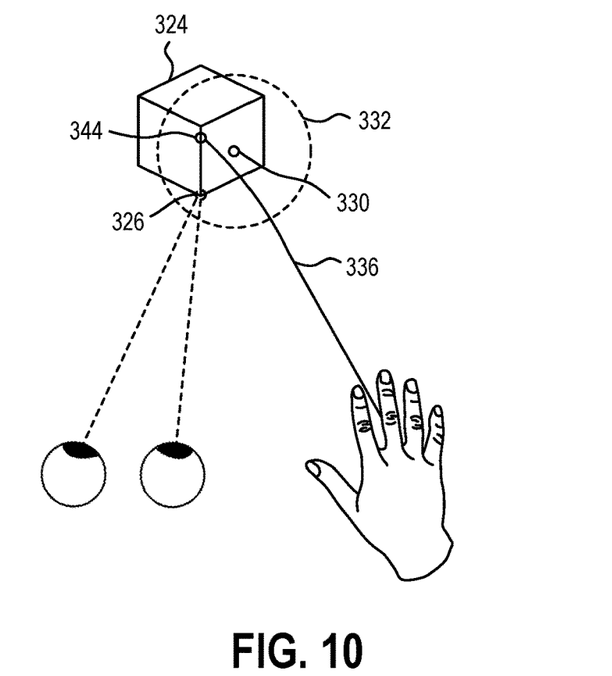
FIG. 10 is a schematic representation of a presented ray snapped to an origin of the targeted virtual element, according to at least one embodiment of the present disclosure.

In some embodiments, the targeting ray may snap to an origin of the virtual element 224 when the gaze location 226 is within the snap region 232 and either of the input ray location 230 or the gaze location 226 is within the edges of the virtual element 224. FIG. 10 illustrates an example of a gaze location 326 positioned within the edges of the virtual element 324, but near the edge, and the input ray location 330 is within the edges of the virtual element 324, but near the edge. The presented ray 336 is snapped to an origin 344 of the virtual element 324 that is positioned away from the edges of the virtual element 324 that may be in or out of the snap region 332. Snapping the targeting ray (i.e., the presented ray 336) to the origin 344 may ensure a selection of or other interaction with the virtual element 324 is received in relation to the virtual element 324.

For example, the origin 344 may be the geometric center (center of the height and center of the width) of the virtual element 324, as shown in FIG. 10. In other examples, the origin may be the volumetric center of the virtual element. In a specific example, the origin of a virtual model of the Eiffel Tower may be positioned closer to the bottom when the origin is a volumetric origin than when the origin is a geometric origin. In yet other examples, the origin may be a "higher certainty area", such as a visible area, a high-contrast area, or other area of the virtual element as selected by the user or by the system.

Snapping the targeting ray to the origin may intuitively indicate to a user to look at or near the origin of the virtual element during interaction with the virtual element, further reinforcing the targeting of the virtual element by drawing the gaze location toward the origin. For example, snapping the targeting ray at the origin of a button may provide a user with an intuitive instruction to look at the end of the targeting ray to positively select the button. Additionally, snapping the end of the targeting ray may leverage the same involuntary response described earlier to unconsciously guide the user's gaze toward the origin of the virtual element by presenting a high-contrast or moving visual element at the origin. For example, the sudden appearance of the snapped targeting ray at the origin of a button may provoke an involuntarily response from the user to look at the end of the snapped targeting ray.

As described herein, the snapping behavior of the targeting ray and the unsnapping behavior of the targeting ray may be asymmetric. For example, the snap region and the unsnap region around the input ray location may be different, as described in relation to FIG. 8. This can limit intended unsnapping of the targeting ray due to jitter in the eye-tracking and/or ray casting, as well as mitigate effects from a leave-before-clicking behavior by a user. Additionally, different snap and unsnap regions, a delay, or dampening (e.g., an unsnap duration of the unsnapping and straightening of the targeting ray) may mitigate unintended movement of the input ray and/or input device.

Figure 11:
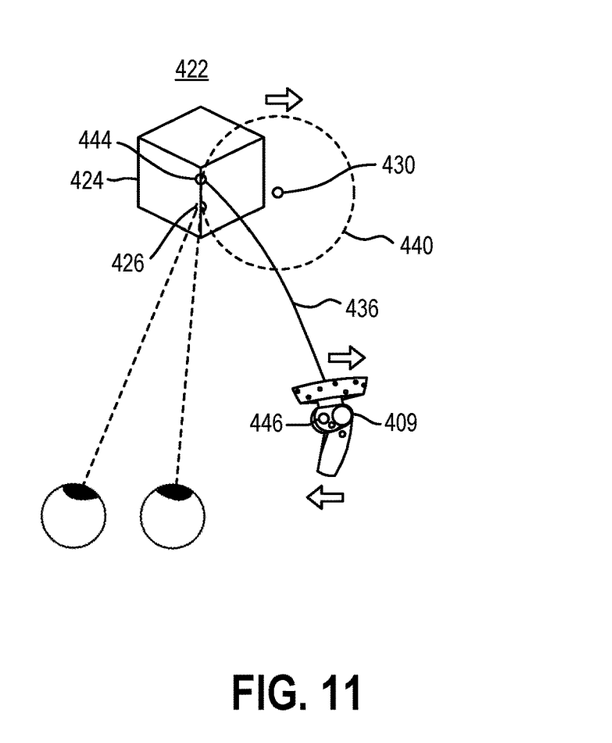
FIG. 11 is a schematic representation of a presented ray remaining snapped to the origin of the targeted virtual element of FIG. 10 while the input device moves, according to at least one embodiment of the present disclosure.

FIG. 11 illustrates an embodiment of a input device 409 that is a 6DOF motion controller. The position and orientation of the input device 409 is projected in the virtual environment 422 as the input ray location 430. The presented ray 436 is snapped to an origin 444 of the virtual element 424. When a user provides a selection command, such as by pressing a button, trigger, thumb stick, pad, or other interaction element 446 of the input device 409, the input device 409 may move, producing an associated movement of the input ray location 430 and the unsnap region 440. In the illustrated example, the unsnap region 440 has moved such that the gaze location 426 is outside of the unsnap region 440. This may result in the presented ray 436 unsnapping from the origin 444 (or, in other examples, from the gaze location 426). As the input ray location 430 is now off of the virtual element 424, the selection command from the input device 409 would fail to select the virtual element 424. In at least one embodiment described herein, a delay or dampening of the unsnapping of the targeting ray may allow the virtual element 424 to be correctly selected by the selection command, despite the movement of the input device 409.

Figure 12:
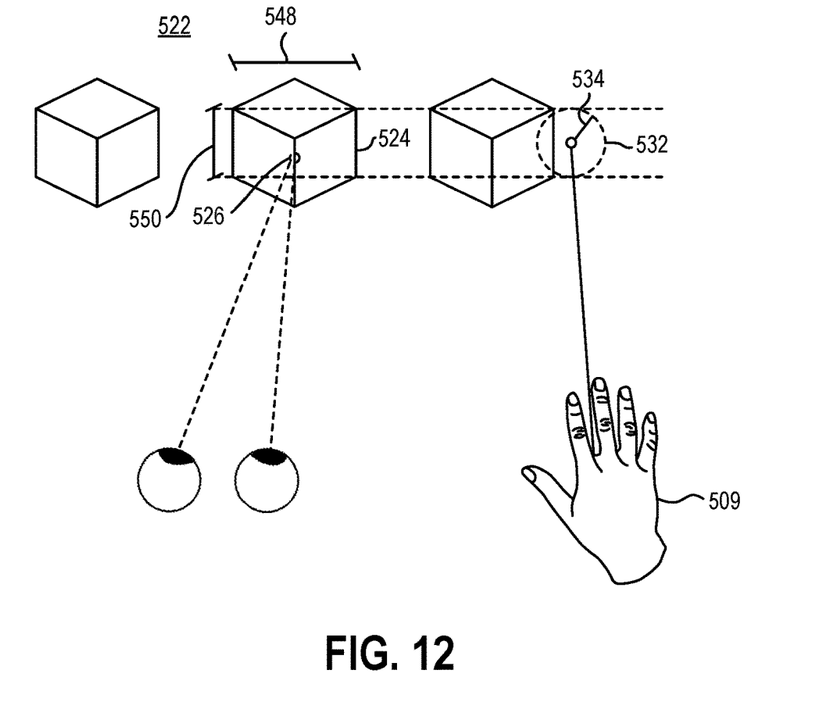
FIG. 12 is a schematic representation of a snap threshold distance changing in response to virtual element dimensions in the virtual environment, according to at least one embodiment of the present disclosure.
Figure 13:
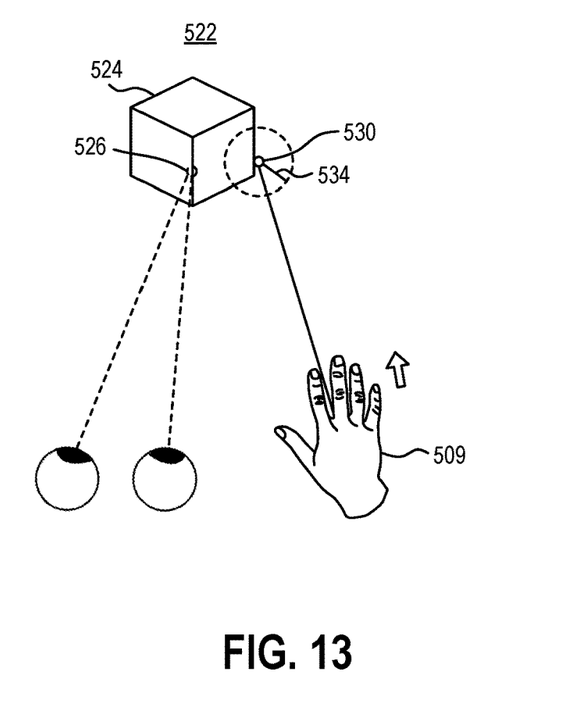
FIG. 13 is a schematic representation of a snap threshold distance changing in response to the input device moving in the virtual environment, according to at least one embodiment of the present disclosure.

FIG. 12 and FIG. 13 illustrate examples of snap regions changing size and/or shape to change the snapping behavior of the targeting ray. FIG. 12 is an example of snap region 532 that may be sized relative to the dimensions of the virtual elements 524 in the virtual environment 522. The snap threshold distance 534 may be based, at least partially, on the width 548 and/or height 550 of a selectable virtual element 524.

This may be particularly helpful in a crowded virtual environment 522 with a plurality of virtual elements 524. In some examples, the snap threshold distance 534 may be changed based on the smaller of the width 548 and height 550 of the virtual element 524, such that the targeting ray does not snap to the gaze location 526 undesirably or continue to follow the gaze location 526 as the user looks at other virtual elements in the virtual environment 522 while holding the input device 509 stationary. As the user may look at each of the virtual elements 524 successively, such as when making a selection from a menu, the targeting ray may otherwise remain snapped to the gaze location 526, distracting the user and interfering with the user's interaction with the virtual environment 522. In this way, the snapping behavior of the targeting ray may balance convenience and distraction to the user.

FIG. 13 is an example of a user moving the input device 509 toward the virtual element 524 in the virtual environment 522 to reduce the snap threshold distance 534 around the input ray location 530. For example, it may be intuitive for some users to reach toward an object while looking at the object to identify the object more precisely. The present example leverages that natural behavior to reduce the snap threshold distance 534 so that the targeting ray snaps to the gaze location 526 only when the targeting ray is closer to the gaze location 526.

In some embodiments, the change in the snap threshold distance 534 may be linear to the change in the distance from the input device 509 to the virtual element 524 in the virtual environment 522. For example, moving the input device 509 in the virtual environment 522 50% of the distance to the virtual element 524 may reduce the snap threshold distance 534 by 50%. In such embodiments, if a user were to reach out with their hand as the input device 509 and "touch" the virtual element 524, the snap threshold distance 534 may approach zero, as the input device 509 would be in contact with the virtual element 524 and the gaze location 526 may be irrelevant in that situation.

In other embodiments, the change in the snap threshold distance 534 may be non-linear to the change in the distance from the input device 509 to the virtual element 524 in the virtual environment 522. For example, moving the input device 509 in the virtual environment 522 50% of the distance to the virtual element 524 may reduce the snap threshold distance 534 by 30%. In yet other embodiments, the change in the snap threshold distance 534 may be non-linear to the change in the distance from the input device 509 to the virtual element 524 in the virtual environment 522. For example, For example, moving the input device 509 in the virtual environment 522 50% of the distance to the virtual element 524 may reduce the snap threshold distance 534 by 30% and moving the input device 509 the remaining 50% of the distance to the virtual element 524 may reduce the snap threshold distance 534 by the remaining 70% such that if a user were to reach out with their hand (the user's hand acting as the input device 509 in conjunction with a gesture recognition device) and "touch" the virtual element 524, the snap threshold distance 534 approaches zero.

In at least one embodiment, a method of interacting with a virtual environment according to the present disclosure may allow for users to select or interact with virtual elements using an input device while assisting the targeting with the user's gaze. Because users typically look at an object or virtual element before interacting with the object, the method is natural and intuitive while increasing accuracy and providing positive feedback. As users become more familiar with a UI or environment, the users' interactions may become faster and exacerbate leave-before-click behaviors. In at least some embodiments according to the present disclosure, methods described herein contemplate one or more features to mitigate or eliminate errors associates with leave-before-click behaviors.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for improving user interaction with a virtual environment, the method comprising:
   presenting the virtual environment to a user on a display;
   measuring a gaze location of a user's gaze relative to the virtual environment;
   casting an input ray from an input device;
   measuring an input ray location at a distal point of the input ray; and
   snapping a presented ray location to the gaze location when the input ray location is within a snap threshold distance of the gaze location without further input from the user.

2. The method of claim 1, the display being a head-mounted display.

3. The method of claim 1, measuring the gaze location using a gaze-tracking device of a head-mounted display.

4. The method of claim 1, the input device being a gesture recognition device configured to recognize a gesture input from the user.

5. The method of claim 1, the snap threshold distance being at least 1°.

6. The method of claim 1, further comprising:
   presenting a presented ray to the user on the display in the virtual environment; and
   bending a portion of a presented ray from a path of input ray to the gaze location.

7. The method of claim 1, further comprising:
   unsnapping the presented ray location from the gaze location when the input ray location is beyond an unsnap threshold distance from the gaze location.

8. The method of claim 7, the unsnap threshold distance being different from the snap threshold distance.

9. The method of claim 7, unsnapping the presented ray location including straightening a presented ray to represent the input ray over a unsnap duration greater than 50 milliseconds.

10. The method of claim 1, further comprising;
    selecting a virtual object at the presented ray location while snapped to the gaze location.

11. The method of claim 1, further comprising snapping the present ray location to a virtual element in the virtual environment.

12. A method for improving user interaction with a virtual environment, the method comprising:
    presenting the virtual environment to a user on a display;
    measuring a gaze location of a user's gaze relative to the virtual environment;
    casting an input ray from an input device;
    measuring an input ray location at a distal point of the input ray;
    snapping a presented ray location to the gaze location when the input ray location is within a snap threshold distance of the gaze location without further input from the user;
    moving the gaze location; and
    tracking the gaze location with the presented ray location when the presented ray location remains within an unsnap threshold distance of the gaze location.

13. The method of claim 12, the unsnap threshold distance being greater than the snap threshold distance.

14. The method of claim 12, further comprising dampening a movement of the gaze location.

15. The method of claim 12, further comprising changing the snap threshold distance based on a position of the input device.

16. The method of claim 12, further comprising changing the snap threshold distance based on an average size of at least a virtual element in the virtual environment.

17. A system for presenting visual information to a user, the system comprising:
    a head-mounted display, the head-mounted display including:
        a display device,
        a gaze-tracking device,
        a processor in data communication with the display device and the gaze-tracking device, and
        a hardware storage device in data communication with the processor, the hardware storage device having instructions thereon that, when executed by the processor, cause the processor to:
            present a virtual environment to the user on a display,
            measure a gaze location of a user's gaze relative to the virtual environment,
            cast an input ray from an input device,
            measure an input ray location at a distal point of the input ray, and
            snap a presented ray location to the gaze location when the input ray location is within a snap threshold distance of the gaze location without further input from the user.

18. The system of claim 17, wherein the user's gaze is a gaze cloud.

19. The system of claim 17, further comprising a waveguide in communication with the display device, where the presented gaze location is presented on the waveguide.

20. The system of claim 17, the gaze-tracking device including a plurality of cameras to track a user's eyes.

* * * * *